Figure 1:
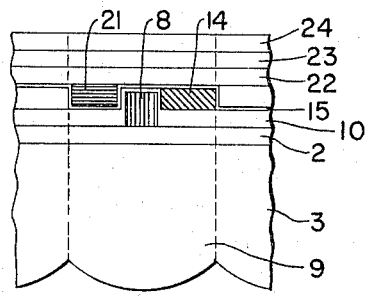
Figure 1:
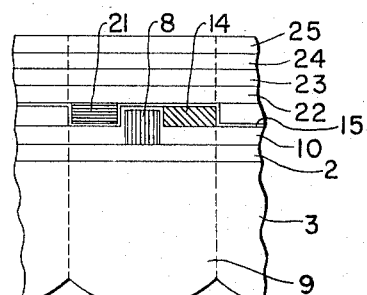

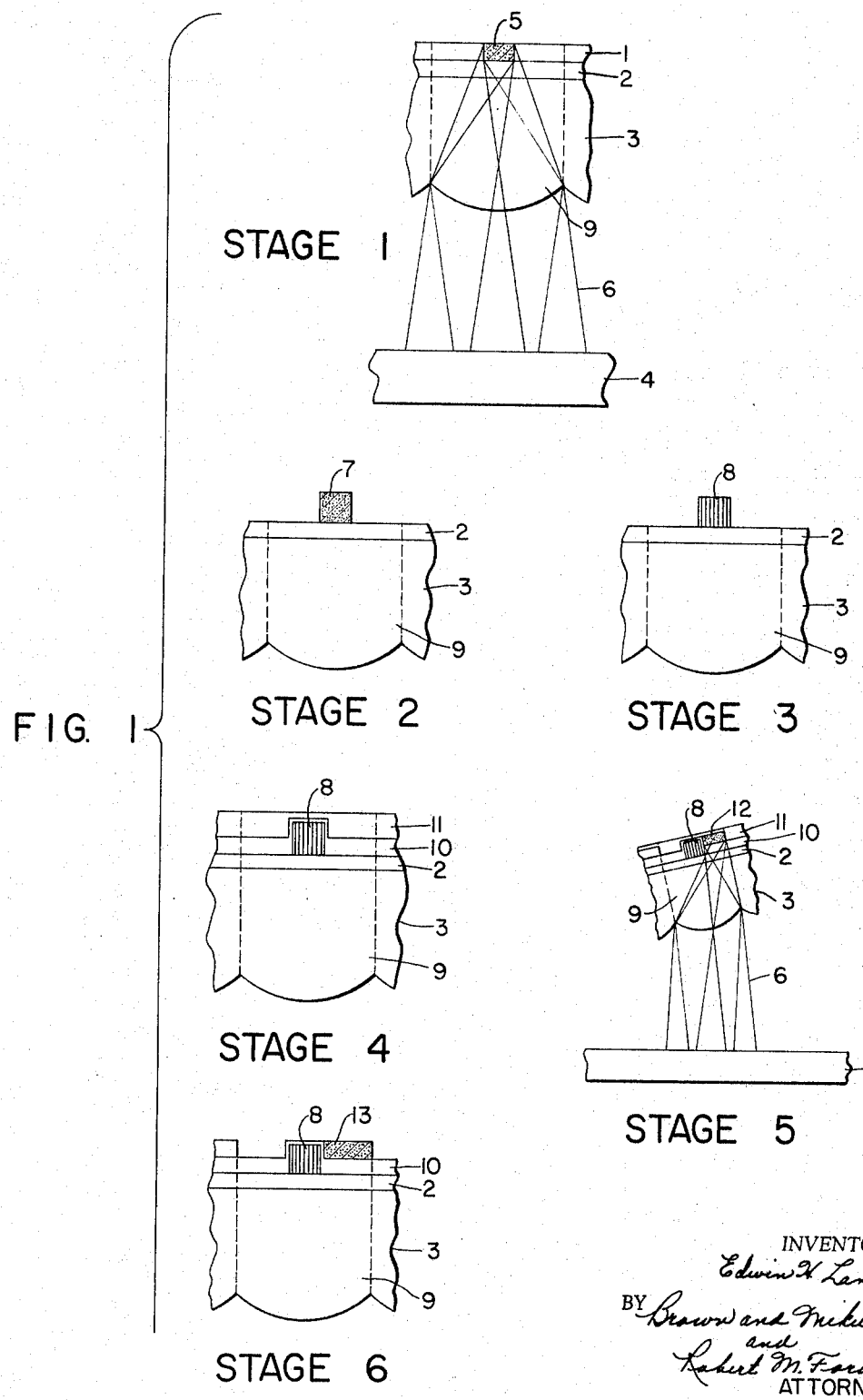

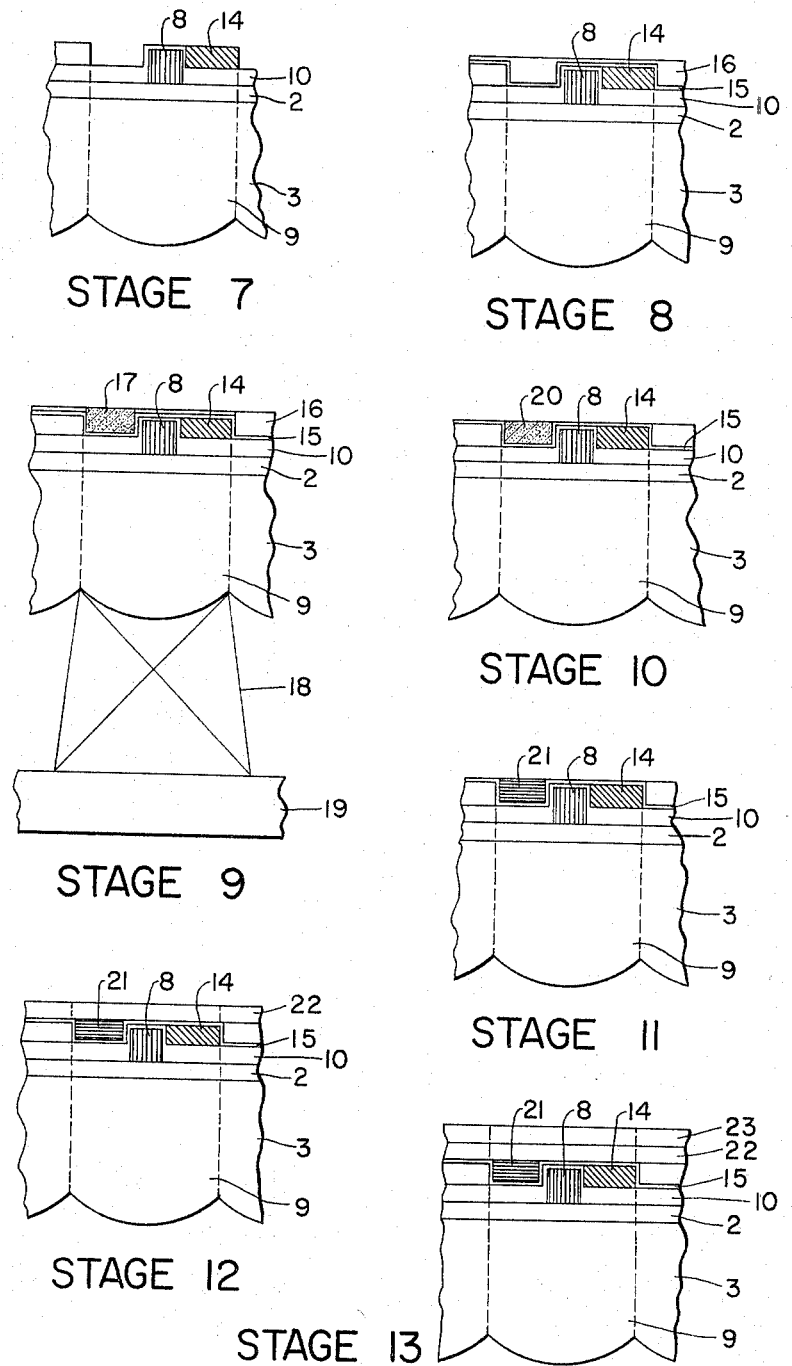

Nov. 8, 1966     E. H. LAND     3,284,208

PHOTOGRAPHIC PRODUCTS AND PROCESSES FOR THE PRODUCTION THEREOF

Filed April 30, 1963     9 Sheets-Sheet 3

STAGE 14

STAGE 15

STAGE 1

STAGE 2

STAGE 3

STAGE 5

STAGE 4

INVENTOR.
Edwin H. Land
BY Brown and Mikulka
and
Robert M. Ford
ATTORNEYS

Nov. 8, 1966     E. H. LAND     3,284,208
PHOTOGRAPHIC PRODUCTS AND PROCESSES FOR THE PRODUCTION THEREOF
Filed April 30, 1963     9 Sheets-Sheet 4

STAGE 6

STAGE 7

STAGE 8

STAGE 9

STAGE 10

STAGE 11

STAGE 12

INVENTOR.
Edwin H. Land
BY Brown and Mikulka
and
Robert M. Ford
ATTORNEYS

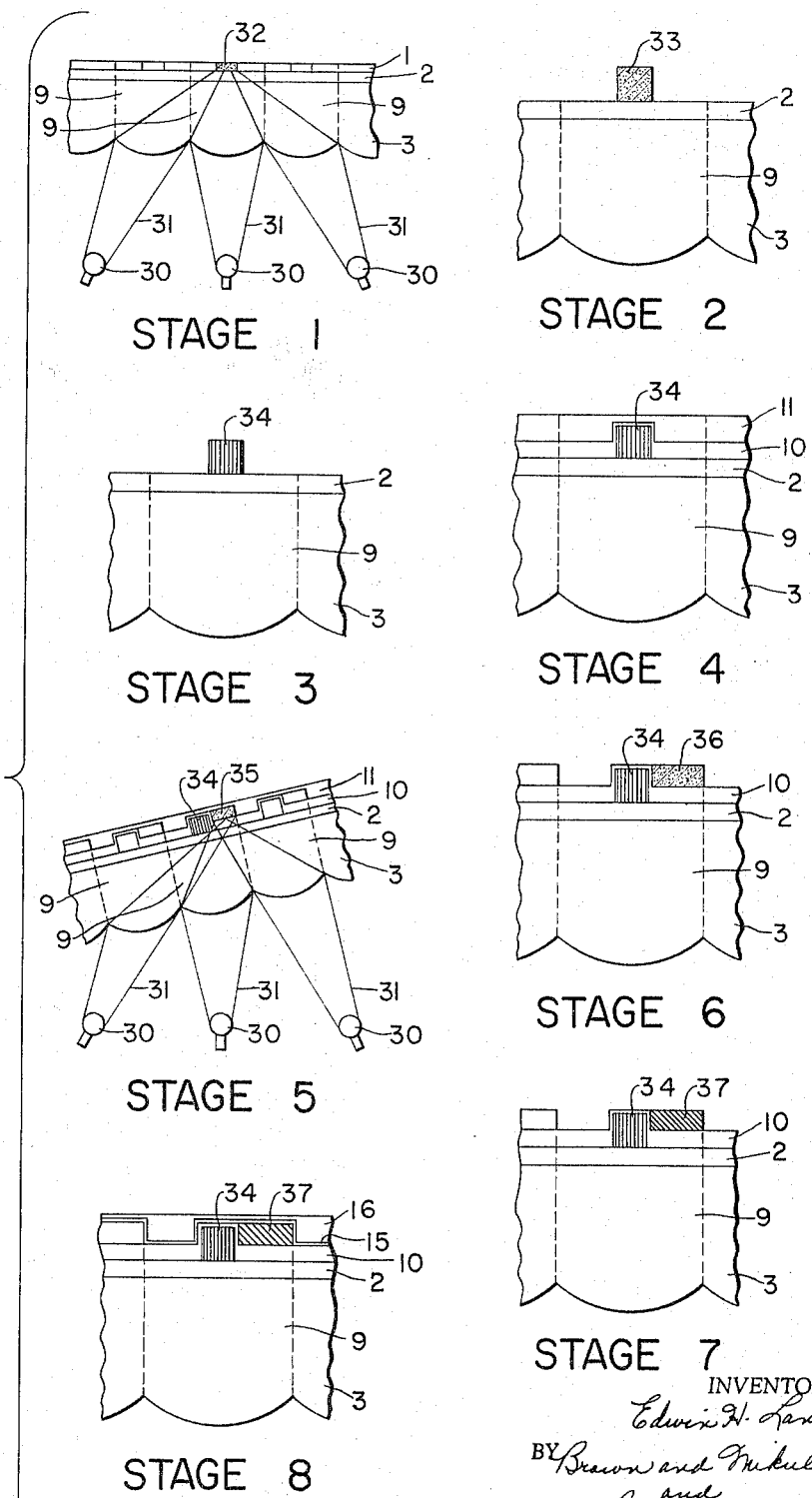

Nov. 8, 1966 E. H. LAND 3,284,208
PHOTOGRAPHIC PRODUCTS AND PROCESSES FOR THE PRODUCTION THEREOF
Filed April 30, 1963 9 Sheets-Sheet 6

STAGE 9

STAGE 10

STAGE 11

STAGE 12

STAGE 1

STAGE 2

INVENTOR.
Edwin H. Land
BY Brown and Mikulka
and
Robert M. Ford
ATTORNEYS

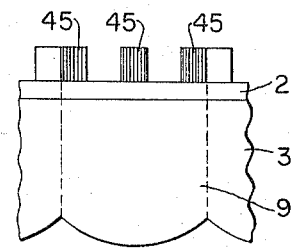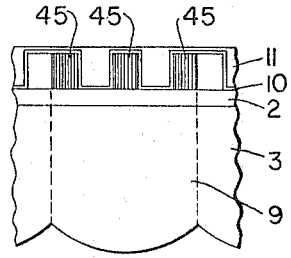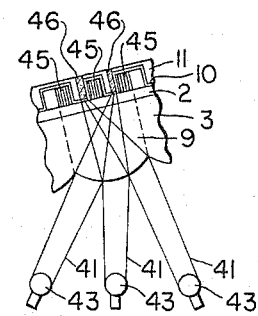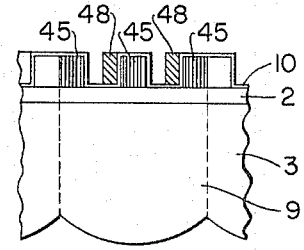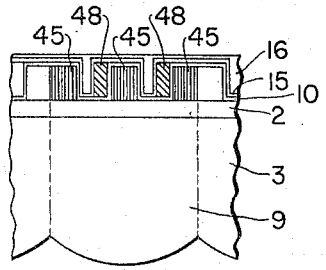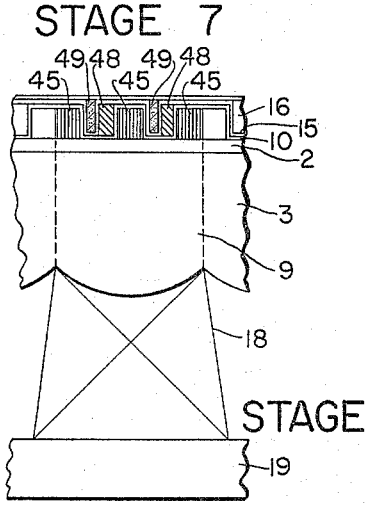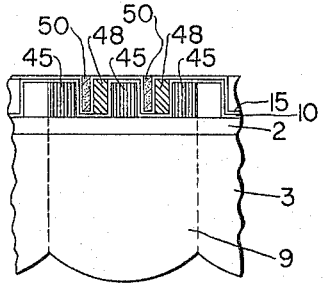

Nov. 8, 1966  E. H. LAND  3,284,208
PHOTOGRAPHIC PRODUCTS AND PROCESSES FOR THE PRODUCTION THEREOF
Filed April 30, 1963  9 Sheets-Sheet 8

FIG. 4 { STAGE II

INVENTOR.
Edwin H. Land
BY Brown and Mikulka
and
Robert M. Ford
ATTORNEYS

Nov. 8, 1966 E. H. LAND 3,284,208
PHOTOGRAPHIC PRODUCTS AND PROCESSES FOR THE PRODUCTION THEREOF
Filed April 30, 1963 9 Sheets-Sheet 9
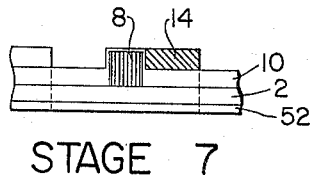
STAGE 7
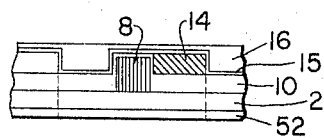
STAGE 8
FIG. 5
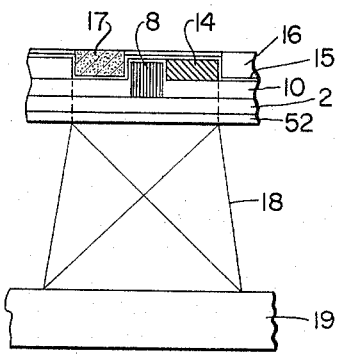
STAGE 9
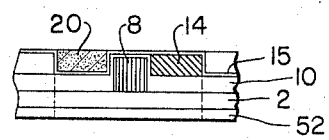
STAGE 10
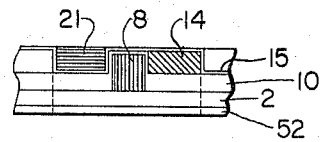
STAGE 11
INVENTOR.
Edwin H. Land
BY Brown and Mikulka
and
Robert M. Ford
ATTORNEYS United States Patent Office 3,284,208
Patented Nov. 8, 1966

3,284,208
PHOTOGRAPHIC PRODUCTS AND PROCESSES
FOR THE PRODUCTION THEREOF
Edwin H. Land, Cambridge, Mass., assignor to Polaroid Corporation, Cambridge, Mass., a corporation of Delaware
Filed Apr. 30, 1963, Ser. No. 276,785
19 Claims. (Cl. 96—118)

This invention relates to photography and, more particularly, to processes particularly adapted for the production of photographic additive color screen elements.

In general, color screen elements comprise a screen pattern formed of a plurality of light-transmitting, colored elements which are each of an independent primary color and which are generally classifiable into different groups in accordance with the color thereof. Thus, a conventional three-color additive screen generally has a set or group of red-colored filter elements, a set of blue-colored filter elements and a set of green-colored filter elements. These filter elements are ordinarily in a mosaic or geometrical pattern in a random or regular distribution.

The production of color screen elements, in accordance with the prior art, may be classified into two major groups.

First, color screen elements may be prepared by totally mechanical means, as, for example, by printing or ruling a dyeable substrate with a greasy ink formulation, in accordance with the desired filter pattern; subjecting the substrate to suitable coloration, in areas which do not possess the repellant ink mask; effecting removal of the mask; and repeating this procedure, in accordance with the geometrical pattern of filter elements desired, a sufficient number of times to provide the desired multiplicity of diversely colored filter elements.

A second mechanical method comprises printing a carrier substrate with the desired dye formulations in accordance with the predetermined filter pattern and repeating this printing procedure a sufficient number of times to provide the multiplicity of color filter elements desired.

A third mechanical method comprises depositing, as an irregular filter screen pattern, a thin layer comprising a random distribution of small grains, such as starch grains, which have been independently colored with the primary colors desired for optical filtering effects.

The second major type of color screen production procedures comprises photomechanical methods of the type initially proposed by Ducos Du Hauron in the nineteenth century. These procedures comprise, in general, coating a suitable support or film base with an adhesive composition having coated thereon a sensitized colloid composition, as, for example, dichromated gelatin; effecting exposure of the sensitized gelatin layer, through a suitable mask which provides an exposure pattern devised in accordance with the desired optical filter element arrangement; effecting differential hardening of the sensitized colloid in accordance with the exposure pattern; removing unexposed, unhardened gelatin by washing; and then subjecting the remaining hardened colloid to a suitable dyeing procedure in order to provide a first-colored optical filter element series. This procedure is repeated, employing appropriate masks, as often as necessary to provide the number of optical filter element types desired in the final color screen element.

The preceding mechanical methods of producing color screen elements by mechanical printing or ruling methods inherently require a great number of mechanically exact printing steps to provide a finished product, and thus possess the relative high cost inevitable to such complexity of production. Because of the extreme difficulties of manufacture, and of the relative production costs in general, additive color screen elements by means of these processes has been extremely limited. Only the so-called Dufay process has had an extended production duration, but, nevertheless, only a relatively limited market.

Methods of producing mechanical mosaic type color screen elements have, in general, provided elements inherently possessing a lack of color balance, as a result of contiguous unit area, formed by the distribution of the small colored grains, possessing a predominance of particles of one color, as a practical result of attempted random distribution. This problem of statistical clumping requires the employment of extremely fine colored grains in order that formation of random aggregates of the same color may be decreased. Attempts to avoid the problem of aggregation by this mechanism gives rise to the additional disadvantage that the thus-prepared units then require very fine grain emulsion and are thereby restricted to low speed photographic processes. Furthermore, due to the necessary increase of interfaces between filter elements per unit area, color saturation is extensively decreased. Experience has also shown that attempts to prevent overlapping of respective filter units, in this system, and to correct for the lack of true juxaposition between respective filters have been, at best, inadequate to provide color filter screens of sufficient optical acuity to attain the desired commercial significance. The only commercial process of this type having extended duration produced the so-called Autochrome plate of Lumiere. This plate comprised a mosaic of red, gren and blue starch grains which were allowed to settle onto a tacky glass surface and then flattened out into tiny filter elements, each about 0.015 millimeter in diameter.

Although initially proposed almost a century ago, photomechanical methods of preparing color screen elements have singly failed to attain commercial significance. This has been true irrespective of the fact that extensive research on such systems has been carried out during the intervening time interval.

One basic problem with regard to photomechanical systems has been encountered in calibrating the filter elements with sufficient accuracy, as regards their surface area, thickness and color intensity, to provide a commercially acceptable product.

Accordingly, it is a principal object of the present invention to provide processes particularly adapted for the photomechanical production of photographic additive color screen film units.

Other obects of the invention will in part be obvious and will in part appear hereinafter.

The invention accordingly comprises the processes which comprise the several steps and the relation and order of one or more of such steps with respect to each of the others, and the products possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawing wherein:

FIGURE 1 is a diagrammatic cross-sectional view illustrating one embodiment of processes, for the production of specified additive multicolor photographic film units, practiced in accordance with the present invention, which comprises the process stages set forth and is further detailed hereinafter; and FIGS. 2, 3, 4 and 5 are diagrammatic cross-sectional views, respectively, similar to that of FIGURE 1, and illustrate additional embodiments of the present invention.

It has now been discovered that photographic multicolor screen elements exhibiting a high degree of optical acuity and particularly adapted for use in additive multicolor photographic processes, both conventional and diffusion transfer types, may be expeditiously prepared, in general, by successively coating on the smooth or flat surface of a lenticular film a plurality of photoresponsive layers. Each photoresponsive layer is subjected to exposure radiation incident on the lenticular film at angles adapted to provide exposed areas of the coating contiguous each lenticule. The unexposed areas of the coating are then removed and the exposed areas dyed to provide a series of chromatic filter elements. The incident radiation employed to effect exposure of successive photoresponsive layers is directed so as to provide formation of each series of chromatic filter elements in substantial side-by-side or screen relationship on the smooth surface of the lenticular film.

Referring now to the drawings and specifically to FIGURE 1, there is schematically shown, in stages, a process for the production of additive multicolor photographic film units in accordance with the present invention. As specifically illustrated, in stage 1, a web, comprising a layer of lenticular film 3 having subcoated thereon an adhesive layer 2, such as a nitrocellulose lacquer layer, which in turn has overcoated thereon a selectively photoresponsive, preferably polymeric, layer 1, such as an approximately 4 microns (dry weight) thick potassium, sodium or ammonium dichromate sensitized gelatin layer, is exposed to radiation 6, preferably ultraviolet radiation, derived from exposure sources 4.

The lines of radiation 6 are directed so as to impinge on lenticules 9, of lenticular layer 3, whereby the radiation traversing each lenticule 9 is focused in an area 5 of photoresponsive layer 1 immediately contiguous each lenticule 9 receiving radiation. For the preparation of trichromatic color screens, the area of exposure 5 comprises approximately one-third of the photoresponsive area immediately contiguous each lenticle 9 and, as a result thereof, approximately a one-third total area of photoresponsive layer 1 is subjected to exposure radiation.

Subsequent to photoexposure, in stage 2, the web is contacted with water or other suitable solvent for the unexposed photoresponsive layer, preferably within the range of about 80 to 140° F., for a time interval of about 3 to 60 seconds, whereby to effect removal of unexposed portions of photoresponsive layer 1, in accordance with the selected exposure pattern, and to provide thereby formation of a resist comprising exposed areas 7.

In stage 3, the web, now comprising exposed areas 7 is contacted with a dye solution, comprising a dye substantive to the resist 7, generally a primary red color acid dye, in order to provide the desired coloration thereto and, as a result, first formed optical filter elements 8. In addition to the dye, the dye solution may contain suitable wetting agents and/or dispersing agents, etc. Subsequent to forming optical filter elements 8, the web may be contacted with cold water or other suitable solvent to remove any residual or excess dye.

In stage 4, the web is dried and the first optical filter element 8 containing surface of the web is coated with an adhesive lacquer layer 10. Subsequent to substantial drying of lacquer coating 10, a second photoresponsive layer 11 is then overcoated on adhesive layer 10.

In stage 5, the web is exposed to radiation 6 from exposure source 4, the lines of radiation 6 being directed so as to impinge on lenticule 9, of lenticular layer 3, at such angles as to provide radiation traversing each lenticule 9 and focusing in area 12 of photoresponsive layer 11, contiguous each lenticule 9. Area 12 is preferably equal to approximately one-third of the surface area of the respective lenticule 9 immediately adjacent photoresponsive layer 11 and, as a result thereof, provides an exposure area 12 approximately equal, in extent, to that of preceding optical filter element 8.

Subsequent to photoexposure, in stage 6, the web is contacted with, for example, water, as previously described, to effect removal of unexposed photoresponsive layer, in accordance with the selective exposure pattern, and provide resist 13.

The web is, in stage 7, contacted with a dye solution containing a dye substantive to resist 13, generally an acid dye of green coloration, to provide second optical filter elements 14.

In stage 8, the web, now containing a first and second series of optical filter elements, has external surface thereof coated with a third adhesive lacquer layer 15 which, subsequent to substantial drying, is over-coated with a third photoresponsive layer 16.

The web is then exposed, in stage 9, to diffuse radiation 18, derived from exposure source 19, whereby to effect impingement of diffuse radiation on the surface of lenticule 9 so as to effect exposure of that area 17 of photoresponsive layer 16, contiguous lenticule 9, which is not masked by first and second optical filter elements 8 and 14, respectively.

Subsequent to photoexposure the web is contacted with water in stage 10, as previously described, whereby to effect removal of unexposed photoresponsive layer, in accordance with the exposure pattern, and provide resist 20.

In stage 11, the web is contacted with a dye solution containing a dye substantive to resist 20, generally an acid dye of blue coloration, to provide third optical filter elements 21.

At any stage subsequent to formation of the first and second series of optical filter elements, the lenticular surface of polymeric lenticular film 3 may be reconstituted as a continuous smooth surface, by application of a suitable solvent such as, for example, acetone, methyl Cellosolve, acetic acid methylene chloride, etc., whereby the deformation pressures created during manufacture of the lenticular film are released and the polymeric layer assumes its original continuous smooth surface. Removal of the lenticular conformation from the external surface of the film unit provides a bearing surface adapted for use in existing conventional photographic apparatus employing additive multicolor film units, in addition to substantially simplifying the transmission of actinic energy through the film unit for photographic exposure and projection purposes. Where desired, the reconstituted surface may be polished, for example, by surface contact with an appropriate rotating polishing cylinder, for the time interval necessary to provide the desired optical characteristics to the web surface.

Optionally, the multicolor screen element may be overcoated with a protective polymeric composition 22, illustrated in stage 12, such as nitrocellulose, cellulose acetate, etc., prior to the external surface thereof having a diffusion transfer print-receiving layer 23, illustrated in stage 13 of FIGURE 1, and/or a panchromatically sensitized photographic emulsion 25 applied thereto.

The plano-convex configuration of each lenticule provides for condensing the incident radiation into converging rays. Hence the position of the areas in the contiguous photoresponsive layer receiving exposure may be accurately controlled by adjusting the divergence of the incident radiation beam and by adjusting the angles between the beam's extreme rays and the axis of the lenticule. Mathematically, the distances from the lenticule axis to the boundaries of the exposed area may be represented by the equations:

$$l \cong f \tan \beta$$

and $$r \cong f \tan \alpha$$

where $f$=the focal length of the lens in air; and $\alpha$ and $\beta$ are each the angle between the lenticule axis and the rays of incident radiation which forms the maximum divergence from each other.

The character of the radiation beam incident on a lenticule, that is, the angles on contact, may be suitably controlled by the use of lenses; reflectors; louvers; radiation source size, type and position; and other techniques known to the art.

The line depth exposure of the photoresponsive layers may be accurately controlled by suitably varying the intensity and/or time of the incident radiation.

It will be readily recognized that the instant processes are particularly adapted for use in the continuous photomechanical production of additive screen elements by continuous processing of a travelling web according to the procedure detailed in explanation of the drawings. This continuous processing may be such as to provide completion of the multicolor screen element as a photographic film unit itself or, where desired, the processing may be interrupted at any stage for further operations at a subsequent time. The web itself may be continuous or discontinuous and may be continuously or intermittently processed, as desired.

Furthermore, the web may comprise an endless and seamless element and, due to the optical properties of the lenticular film, inspection of line width and color saturation may be effectively performed while operating continuously inasmuch as the lenticular film acts as an integrating self magnifier.

It is not essential that the radiation rays incident on each lenticule form exactly the same angles, with respect to the axis of that lenticule, as is formed between rays incident on other lenticules, and their respective axes. However, the more identical the correspondences between the angular pattern of incident radiation of each lenticule, the greater the facility of registering respective filter elements and the more uniform the resultant color screen.

In addition, although it is not essential that the lenticules comprising a component of a continuous web or sheet be aligned parallel to the direction of web travel, it has been determined that this orientation comprises the most simple and preferred system.

The instant processes provide a number of distinct advantages over the processes heretofore employed for photomechanical production of multicolor screen elements. Among these advantages, mention may be made of the following as illustrative.

There is no problem of providing good contact between the lenticular film and the respective photoresponsive layers in that an integral unitary element may be employed, in contradistinction to conventional photomechanical processes which employ contact printing through an appropriate grating. The aforementioned unitary element also alleviates any problems of dirt or dust collecting on or between the exposure surface of the photoresponsive layer and a displaceable grating and, further, the unitary element also prevents slippage arising during continuous processing of same.

Further advantages are obtained in that the instant processes avoid the parallax problems normally coincident with use of conventional contact printing procedures and, in addition, require less exposure time in that the lenticules provide concentration of the radiation incident thereon, in contradistinction to the absorbing or reflecting properties of gratings or grids.

Figure 2:
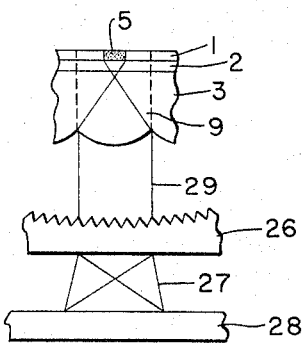
Figure 2:
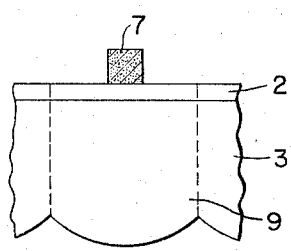
Figure 2:
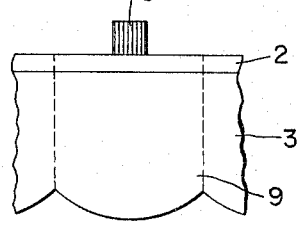
Figure 2:
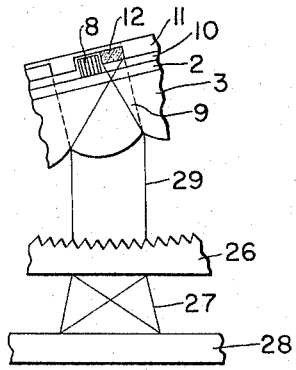
Figure 2:
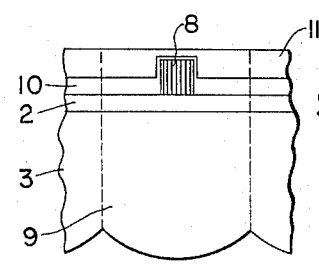
Figure 2:
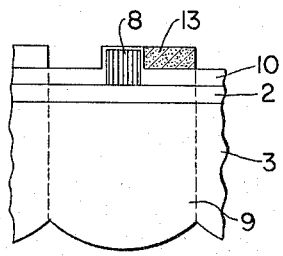
Figure 2:
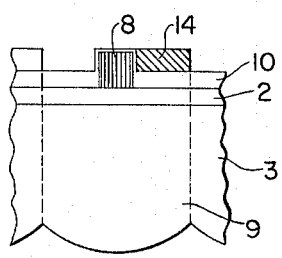
Figure 2:
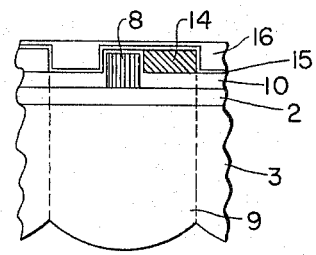
Figure 2:
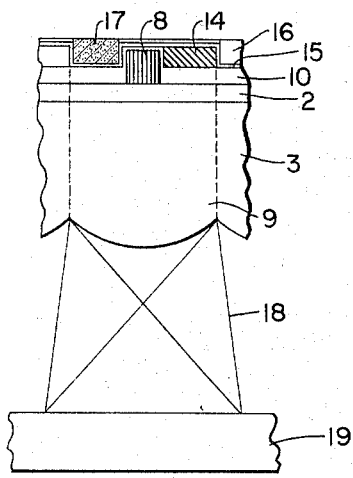
Figure 2:
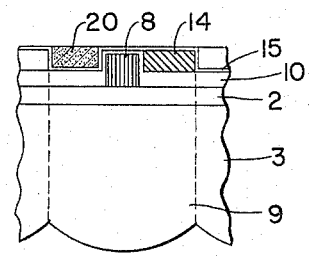
Figure 2:
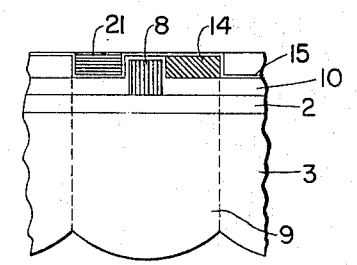
Figure 2:
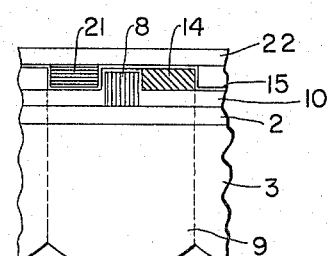

As is specifically illustrated in FIG. 2, radiation 29 incident on lenticular film 3, within predetermined incident angles, may be provided by diffuse radiation 27 from a conventional exposure source 28, for example, a mercury arc ultraviolet exposure source, traversing through a Fresnal type lens 26.

As previously mentioned, the first chromatic filter elements are prepared by exposing the first photoresponsive layer to radiation incident on the lenticules of the lenticular film receiving the radiation at a first angle, whereby each lenticule receiving such radiation focuses same on a sector of the photoresponsive layer contiguous to and, preferably, substantially in the focal plane of the particular lenticule.

For preparation of the preferred three-color additive screens, the exposed area of the photoresponsive layer comprises about one-third of the area of this layer contiguous the lenticule receiving the exposure radiation.

Exposure of the second photoresponsive coating is then accomplished by radiation incident on the lenticules of the lenticular film at a second angle adapted to provide exposure of about one-third of the area of the second coating contiguous each exposed lenticule and in the focal plane thereof, most preferably substantially adjacent or in juxtaposition to the first formed chromatic filter element.

By proper choice of the photosensitive system or of the incident radiation, the first filter element may be opaque to selective radiation. It is then desirable to overlap the second set of images on the first set of elements without creating a black band due to the presence of superimposed areas of primary additive colors. Variables in the manufacture of the second set of elements will then cause less variation in the width of the second elements than would be encountered without this intentional overlap. Furthermore, intentional overlap can prevent small gaps between the first and second elements; these gaps, even if they are filled in with the third color, are disadvantageous in the photographic utilization of the color screen.

Figure 3:
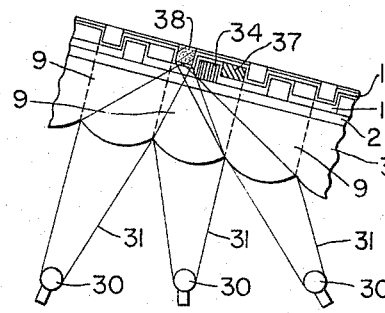
Figure 3:
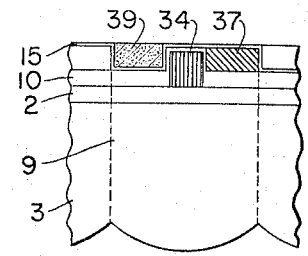
Figure 3:
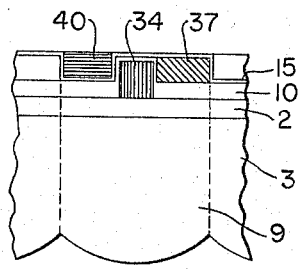
Figure 3:
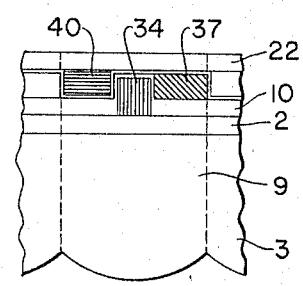

It will be recognized that although, as previously described, the terminal chromatic filter element formation may be provided by exposing the terminal photoresponsive layer to diffuse radiation traversing through the lenticular film and masked by the previously formed chromatic filter elements, the terminal chromatic filter elements may also be provided by impinging radiation incident of the lenticules of the lenticular film at third angles adapted to provide exposure to the terminal photoresponsive layer contiguous the lenticule receiving radiation and adjacent the previously formed chromatic filter elements, as illustrated in stage 9 of FIG. 3.

Where it is desired that the radiation impinging on one or more of the photoresponsive layers possess greater intensity or that the time of exposure be extensively reduced, the web may be subjected to exposure radiation incident on a plurality of lenticules at angles adapted to focus such radiation in areas of a photoresponsive layer contiguous a single lenticule.

An embodiment of this type is depicted in FIG. 3 where, in stage 1, lenticular film 3 having first photoresponsive coating 1, on the smooth surface thereof, is exposed to a plurality of radiation beams 31, incident on a plurality of lenticules 9, from a plurality of point sources 30. Radiation beams 31 are incident on lenticules 9 at such first angles as to provide focusing of the radiation through each lenticule 9 in area 32 of photoresponsive layer 1, contiguous a single lenticule 9.

Unexposed coating is then removed, the resultant resist 33 dyed to provide filter element 34, and the filter element 34 containing surface of lenticular film 3 coated with second photoresponsive layer 11, in accordance with the procedural stages previously set forth.

In stage 5, the web is exposed to a plurality of radiation beams 31 incident on a plurality of lenticules 9 at second angles adapted to provide exposed area 35 in second photoresponsive layer 11, contiguous a single lenticule 9, and preferably in side-by-side relationship to first formed optical filter element 34.

Unexposed coating is then removed, the resultant resist 36 dyed to provide filter element 37, and filter element 37 containing surface of lenticular film 3 coated with third photoresponsive layer 16, in the manner previously detailed.

In stage 9, the web is exposed to a plurality of radiation beams 31 incident on a plurality of lenticules 9 at third angles adapted to provide exposed area 38 of third photoresponsive layer 16, contiguous a single lenticule 9, and preferably in substantially side-by-side relationship to first and second formed optical filter elements 34 and 37.

The web is then processed to provide resist 39 and filter element 40 in accordance with the procedures previously detailed.

Figure 4:
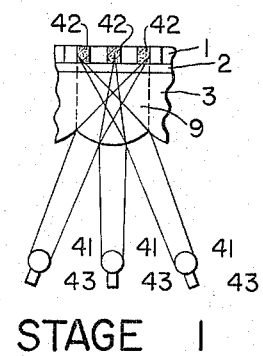
Figure 4:
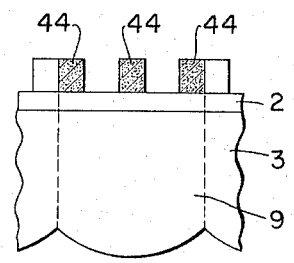

For the production of multicolor additive screen elements possessing a large number of filter elements per unit area, a plurality of chromatic filter areas may be provided in one or more of the photoresponsive layers contiguous each lenticule in accordance with the processes of FIG. 4.

In such processes, lenticular film 3 having first photoresponsive coating 1, on the smooth surface thereof, is exposed to a plurality of radiation beams 41, from a plurality of point sources 43, incident on lenticule 9 at a first series of angles, whereby to form a plurality of exposed areas 42 of the coating, contiguous each lenticule 9 of lenticular film 3 receiving radiations 41, as illustrated in stage 1.

Unexposed coating is then removed and exposed areas 44 are dyed, in accordance with the description previously detailed, to provide a plurality of chromatic optical filter elements 45, contiguous each lenticule 9.

As previously stated, in stage 4, a second photoresponsive layer 11 is coated on the external surface of the first formed filter elements. The web is then exposed, in stage 5, to radiation incident on the lenticular film at a second series of angles, whereby to form a plurality of exposed areas 46, of the second coating contiguous each lenticule 9 of lenticular film 3 receiving radiation beams 41.

Unexposed coating is then removed and exposed areas 47 are dyed, in the manner previously set forth, to provide a second plurality of chromatic optical filter elements 48, contiguous each lenticule 9. The respective filter elements 48 are preferably substantially in juxtaposition to individual filter elements 45 of the first plurality of filter elements.

The remaining stages of the procedure illustrated in FIG. 4 may be performed in accordance with the preceding description to provide formation of a plurality of exposed areas 49. The web is then processed to provide a plurality of resists 50, which are, in turn, dyed to provide a third plurality of optical filter elements 51.

Figure 5:
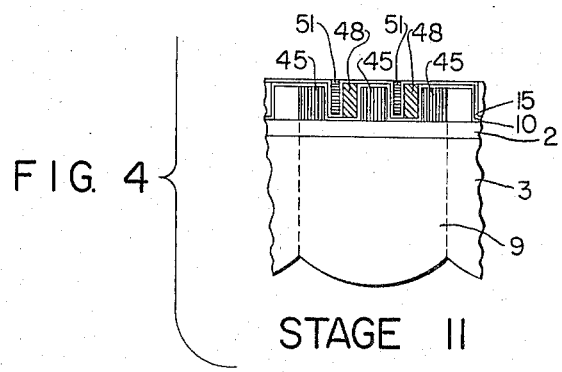
Figure 5:
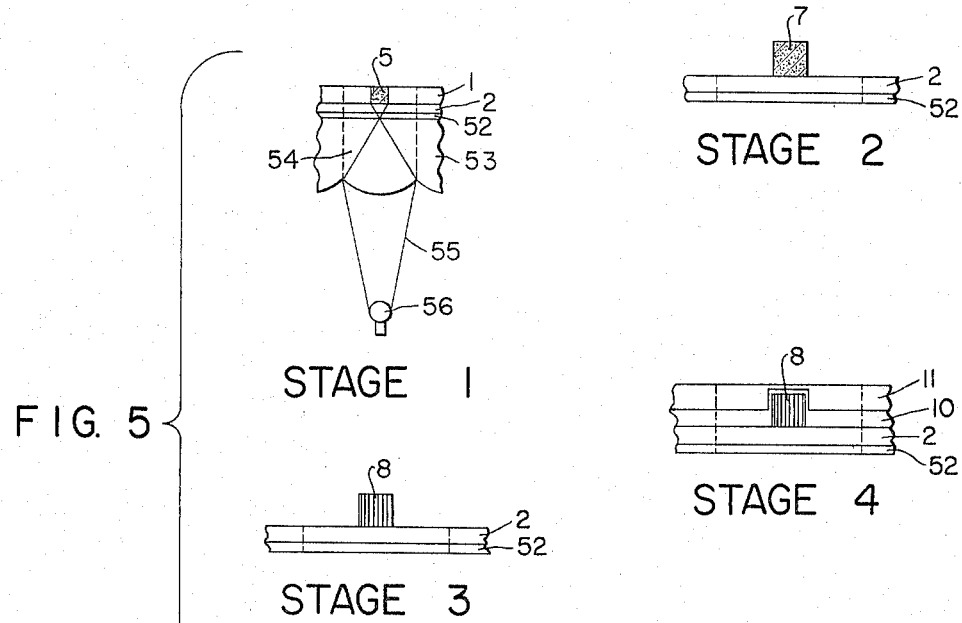
Figure 5:
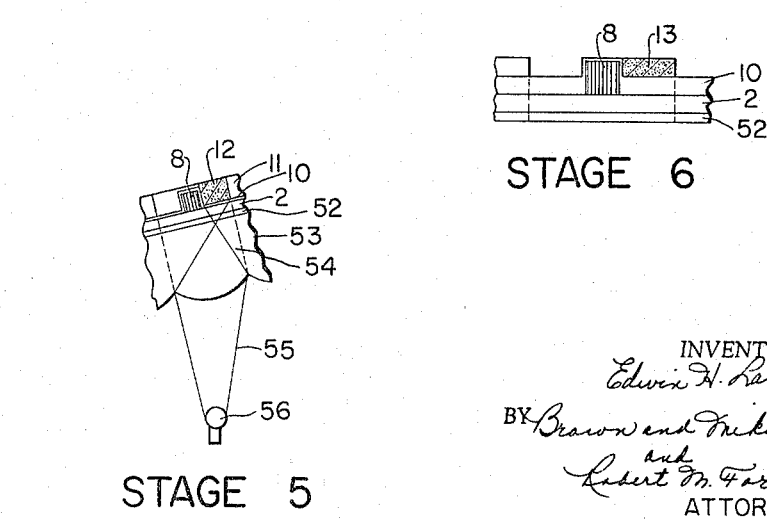

Although the web preferably comprises a layer of lenticular film, as a constituent component, a separate sheet or web of lenticular film may also be employed, as illustrated in FIG. 5.

In this embodiment, the necessity of subjecting the product, containing optical filter elements, to a separate processing step of the type previously detailed, in order to effect removal of its lenticular surface, is avoided.

In performing the embodiment illustrated in FIG. 5, a web comprising a support 52, having subcoated thereon an adhesive lacquer layer 2, has overcoated thereon a selectively photoresponsive layer 1.

In stage 1, lenticular film 53, comprising lenticule 54, is brought into superposed relationship with the external exposure surface of photoresponsive layer 1, prior to or concurrent with effecting exposure of layer 1 by incident radiation 55, from point source 56, in accordance with the procedures previously detailed.

Subsequent to the first exposure, lenticular film 53 may be displaced from its superposed relationship with the web and may be processed in stages 2, 3 and 4 according to the procedures previously detailed.

In stage 5, formation of the second series of optical filter elements is then accomplished by registering lenticular film 53 in superposed contact with photoresponsive layer 11 and effecting exposure and processing of same in accordance with the parameters previously set forth.

Subsequent to the formation of second optical filter elements 14, lenticular film 53 may be again displaced and the web processed in stages 6 to 11, inclusive, according to the procedures detailed hereinbefore.

It will be recognized that the techniques set forth herein provide a method of preparing optical filter screens possessing a greater number of individual chromatic filter elements per unit area than practically possible employing techniques heretofore known.

For use in diffusion transfer additive color photographic systems, the preferred film units have a panchromatically sensitized photographic emulsion coated on the external surface of a transfer print-receiving layer, either with or without, but most preferably with, a stripping layer 24 positioned intermediate the print-receiving layer and emulsion layer, and illustrated in stages 14 and 15 of FIGURE 1, to facilitate separation of the emulsion layer subsequent to transfer processing. The stripping layer itself may comprise a polymeric substance, such as hydroxyethyl cellulose, cellulose acetate hydrogen phthalate, etc.

Diffusion transfer additive color photographic processes are disclosed in U.S. Patents Nos. 2,614,926; 2,726,154; 2,944,894; and 2,992,103, issued October 21, 1952; December 6, 1955; July 12, 1960; and July 11, 1961, respectively.

Particularly desirable results are obtained when the silver precipitating agents in the image-receiving layer are disposed in a matrix comprising a macroscopically continuous stratum comprising sub-macroscopic agglomerates of minute particles of a suitable water-insoluble, inorganic, preferably siliceous material, such, for example, as silica aerogel. Suitable matrices of this type are disclosed in U.S. Patent No. 2,698,237.

The image-receiving layer may itself be comprised of one or more strata of a permeable substantially transparent material. As examples of image-receiving materials of such a nature, mention may be made of: regenerated cellulose; polyvinyl alcohol; partially hydrolyzed polyvinyl acetate; sodium alginate; cellulose ethers, such as methyl cellulose or other cellulose derivatives such as sodium carboxymethyl cellulose or hydroxyethyl cellulose; proteins, such as gelatin or glue; carbohydrates, such as gums and starches; and mixtures of such materials, as for example, polyvinyl alcohol and gelatin, where they are compatible.

It will be recognized that the silver-receptive stratum should be so constituted as to provide an unusually vigorous elemental silver precipitating environment which causes the elemental silver deposited therein, in comparison with the amount of silver developed in the silver halide photosensitive layer, to possess very high covering power, that is, opacity per given mass of reduced silver.

Especially suitable as silver precipitating agents are the metallic sulfides and selenides, these terms being understood to include the selenosulfides, the polysulfides, and the polyselenides. Preferred in this group are the so-called "heavy metal sulfides." For best results it is preferred to employ sulfides whose solubility products in an aqueous medium at approximately 20° C. vary between $10^{-23}$ and $10^{-30}$ and especially the salts of zinc, cadmium and lead. Also suitable as precipitating agents are heavy metals such as silver, gold, platinum, palladium, and mercury, and in this category the noble metals are preferred and are generally provided in the matrix as colloidal particles.

As disclosed in U.S. Patent No. 2,698,244, issued December 28, 1954, to Edwin H. Land, diffusion transfer processing may be effected by disposing a liquid processing composition in a rupturable container so positioned in regard to the appropriate surface of a silver halide emulsion that, upon compression with a spreader sheet, a substantially uniform layer of processing composition is distributed over the surface of said photosensitive emulsion, positioned distally from the image-receiving layer. The processing composition may be one of the film-forming processing compositions disclosed in U.S. Patent No.

2,543,181, issued February 27, 1951, to Edwin H. Land. It may comprise, for example, a developing agent such as hydroquinone, an alkali such as sodium hydroxide, a silver halide complexing agent such as sodium thiosulfate, and a high molecular weight film-forming thickening agent such as sodium carboxymethyl cellulose. All these materials are preferably in aqueous solution. These photographic agents are preferably contained in solution in the processing liquid prior to the application thereof, but they may be in part or wholly added to the processing composition as it is spread between the spreader sheet and the photosensitive silver halide emulsion, said agents being so located on or adjacent to the surface of one or both of said layers as to be dissolved by or otherwise interacted with the liquid agent when the latter wets said surface.

In carrying out the aforementioned transfer process, the photosensitive silver halide emulsion is photoexposed to form therein a latent image. A substantially uniform distribution of processing composition is distributed on the external surface of said emulsion, as for example, according to the previously decribed procedure. Processing composition reagents permeate into the photosensitive emulsion, developing the latent image contained therein according to the point-to-point degree of exposure of said emulsion. Substantially contemporaneous with the development of the latent image, an imagewise distribution of soluble silver complex is formed from unexposed and unreduced silver halide within said emulsion. At least part of said silver complex is transferred, by imbibition, to the print-receiving stratum. The transferred silver complex is reacted to provide a positive, reversed image of the latent image. Subsequent to formation of the positive image in the image-receiving layer, dissociation of said layer from the emulsion layer may be effected.

It must be noted that abrasion-resistant properties may be provided to the image-receiving layer, by the inclusion therein of deacetylated chitin, as disclosed in the copending U.S. application of William H. Ryan et al., Serial No. 808,123, filed April 22, 1959, now Patent No. 3,087,815, while alleviates the necessity of subsequently overcoating the external surface of image-receiving layer with a transparent abrasion-resistant water-insoluble plastic, to prevent subsequent laceration and resultant degradation of the positive image, subsequent to removal of the emulsion from contact therewith.

The concentration of deacetylated chitin disposed in the image-receiving layer may be varied over a wide range according to the degree of rigidity desired, during and subsequent to processing, and the thickness and character of the image-receiving stratum employed.

Other materials may be substituted for those used in the foregoing process and the proportions may be varied to an appreciable extent. For example, the film-forming material in the processing composition which imparts the desired viscosity to the latter may be any of the high molecular weight polymers which are stable to alkali and which are soluble in aqueous alkaline solutions. For example, such other plastics as hydroxyethyl cellulose, polyvinyl alcohol, and the sodium salts of polymethacrylic acid and polyacrylic acid may be used. The plastic is preferably contained in the processing composition in sufficient quantity to impart to the composition a viscosity in excess of 1,000 centipoises at a temperature of approximately 20° C. Preferably, the viscosity of the processing composition is of the order of 1,000 to 200,000 centipoises.

Other developing agents may be used, for example, one of the following: p-aminophenol hydrochloride; bromohydroquinone; chlorohydroquinone; diaminophenol hydrochloride; diaminophenol dihydrochloride; toluhydroquinone; monomethyl-p-aminophenol sulfate; a mixture consisting by weight of ½ hydroquinone and ½ p-hydroxyphenylaminoacetic acid; and a mixture consisting by weight of ¼ hydroquinine and ¾ p-hydroxyphenylaminoacetic acid.

To form the soluble silver complex, such other complex-forming substances as sodium thiocyanate, ammonium thiocyanate and ammonia may be employed.

The present invention will be illustrated in greater detail in conjunction with the following specific example which sets out a representative fabrication and employment of the additive multicolor film units of the present invention, which however, is not limited to the detailed description herein set forth but is intended to be illustrative only.

A lenticular film was first coated with an adhesive composition containing 70 cc. of methanol, 1.25 grams of nitrocellulose, and 30 cc. of butyl alcohol. A first layer of gelatin which had been sensitized by the addition of 15 weight percent potassium dichromate (based on dry gelatin), was then coated on the external surface of the first adhesive layer. The first gelatin layer was then exposed to ultraviolet radiation, in accordance with previously detailed explanation of FIG. 1, and the resultant photoexposed carrier subjected to the described water wash steps to provide removal of unexposed sensitized gelatin, in accordance with the exposure pattern contained in the first gelatin layer. The web was then treated with an acid dyeing bath comprising 1.17% Direct Red C.I. 81; 0.32% Direct Yellow C.I. 4; and 2.95% glacial acetic acid. The web was then rinsed to effect removal of excess dye, dried and a second adhesive composition containing 70 cc. of methanol, 30 cc. of butyl alcohol, and 1.25 grams of nitrocellulose was overcoated thereon. A second layer of gelatin which had been sensitized by the addition of 15 weight percent potassium dichromate was coated on the second adhesive layer. The second photosensitized gelatin layer was exposed to ultraviolet radiation in accordance with the previously detailed description. The second gelatin layer was then washed with water to effect removal of unexposed photosensitive gelatin, in the manner previously detailed. The remaining gelatin resist was dyed by contact with an acid dyeing solution containing 0.83% Acid Green C.I. 7; 0.32% Direct Yellow C.I. 4; and 2.86% glacial acetic acid. The web was then rinsed to effect removal of any residual excess dye, dried and coated with a third adhesive composition comprising 30 cc. butanol, 1.25 grams of nitrocellulose, and 70 cc. of methanol. A third layer of gelatin which had been sensitized with 15 weight percent potassium dichromate was then coated on the external surface of the third adhesive layer. The third photosensitive gelatin layer was subjected to exposure by ultraviolet radiation, in accordance with the description detailed previously. The third layer of photosensitive gelatin was then washed in order to provide the desired resist formation. The resultant resist was dyed by contact with a solution containing 1.0% Blue T Pina and 1% glacial acetic acid. A protective overcoat layer was then provided by coating the external surface of the multicolor screen element with a composition comprising 70 cc. methanol, 30 cc. butanol, and 5 grams of nitrocellulose. A diffusion transfer image-receiving layer comprising a silver-receptive stratum containing silver precipitating nuclei dispersed in a matrix of colloidal silica was then coated on the external surface of the protective layer, according to the practice described in U.S. Patent No. 2,823,122, issued February 11, 1958, to Edwin H. Land. The image-receiving layer was then overcoated with a panchromatic silver iodobromide gelatin emulsion.

The thus-formed additive multicolor diffusion transfer film unit was then exposed to a predetermined subject and the latent image contained in the emulsion diffusion transfer processed, by contact thereof with a diffusion transfer processing composition, in accordance with the practice previously described. After an imbibition period of approximately 60 seconds the emulsion, together with the processing composition, was stripped from contact with the image-receiving layer to uncover a positive transfer print formed in the image-receiving layer.

Projection of the resultant additive multicolor print showed satisfactory contrast, density and range.

It may be found that after the dyeing of layers of monochromatic filter elements, there may tend to remain, even after rinsing, a molecular film of the dye over the areas previously stripped. Under these circumstances, it may be preferred to forcibly separate the excess dye from the unexposed areas and this may be accomplished by directing vigorous air blasts in the direction parallel to the longest side of the particular areas being operated on.

Although acidic or basic dyes may be used in the present process, it is desirable to use acidic dyes which are generally considered to be more durable and to possess better tone. Various suitable wetting agents may also be added to the dye solutions to further insure a thorough penetration of the dye into the desired areas.

Various colors and numbers of colors may be used in this invention but the basic system is a tri-color arrangement of the three primary colors, red, green and blue. A four-color system such as red, green, violet-blue and orange-yellow could be used also, by a sequential series of exposures effecting approximately one-fourth of the respective photo-responsive area providing formation of optical filter elements comprising a single selected color, followed by a fourth overall exposure, in accordance with the teachings of the instant disclosure. Furthermore, it will be recognized that, in accordance with the instant disclosure, a plurality of chromatic filter element series may be provided, the number of series being determined by the optical parameters of the lenticules comprising the selected lenticular film base employed. For example, a plurality of monochromatic filter elements may be provided by sequentially exposing and processing a plurality of sequentially deposited photoresponsive layers. The exposure medium comprising a sequence of respective exposures to parallel radiation incident on the lenticular film at a series of angles adapted to provide exposure areas in the respective photoresponsive layers whereby to provide a plurality of adjacent monochromatic filter elements.

It is desirable of course that the adhesion of the carrier, the three monochromatic filter layers, etc., should be very secure so that the individual structures will remain bonded during the manufacture and processing of the finished product, and further that there will be subsequently no mechanical separation of the various layers which will create optical and mechanical difficulties.

Under these circumstances, it is desirable that adhesive or lacquer layers be interposed between respective layers and filter elements. The adhesive layer selected should be one which does not deleteriously interfere with the transparency of the final product, and yet provides sufficient adhesive capacity so as to allow vigorous treatment of the film unit during and subsequent to its production. The aforementioned nitrocellulose has been found to be a highly desirable bonding agent, although other adhesives known in the art for the instant purposes may be employed, where desired.

The bond obtained throughout the entire unit by this invention should be sufficient to withstand the vigorous treatment such as air blasting and heat to which the unit may be exposed. Moreover, there should be no local separation of the various layers during mechanical treatments that would cause spots, particularly on magnification.

Although for photographic purposes the panchromatic emulsion layer could be applied to the rear side of the carrier, for practical purposes it is necessary to coat the emulsion on the color screen side of the carrier to provide high color saturation.

After exposure of this film, a latent image is formed in the emulsion layer and this may be processed in the same manner as black and white images are processed, without regard to the filter screen which is spaced between the carrier and the panchromatic emulsion, particularly where the filter screen is protected by a protective polymeric composition.

If a positive transparency film is desired, the image may be reversed in the conventional manner or the positive transparency film may be provided by the aforementioned diffusion transfer photographic processes.

In the description herein, each color series of filter elements has been described as covering that part of the total area in proportion to the total number of colors used, i.e., in the tri-color system, each color occupies one-third of the total area. This may vary quite widely before having a noticeable effect to the observer and, in fact, may be compensated by changing the intensity of the colors. In actual practice, if one dye is of greater intensity than the others, a deliberate compensation may be made by reducing the total relative area of the intense color. The aspect of relative areas is well known in the art so that when relative areas are used in this application, it is intended to include the variances which the art would recognize as being successful.

Lenticular films employed have comprised 320, 550 and 635 lenticules per inch and may be prepared by any of the conventional procedures well known for production of such films. The focal length of the light modulating lenticules employed is generally in the order of about $100\mu$ in air and, as a result of this short focal length, any object over about one inch from the lens surface is at infinity. As a consequence of this maintenance of the exposure source in focus is simplified.

Specifically, a suitable polymeric film base web may be continuously contacted with a rotating embossing roller under appropriate conditions of temperature, pressure and/or solvents to provide lenticules of the shape and size desired.

As further examples of compositions suitable for employment as the photoresponsive layer, mention may be made of photosenitized albumin, casein, gum arabic, polyvinyl alcohol, and other light-sensitive polymers known in the art as adapted for employment in photomechanical reproduction, particularly those known for the production of resists by photomechanical means.

As examples of additional dyes for effecting coloration of the optical filter units, mention may be made of fast red dyes such as Acid Reds C.I. 1 and C.I. 34, which may be mixed with Direct Red C.I. 24, Acid Yellow C.I. 36 or direct Yellow C.I. 4; acid green dyes such as Acid Green Pina, (trade name of Farbwerke Hoechst Ag., Frankfurt, Germany, for a triphenyl methane dye) which may be mixed with the above yellow dyes; and acid blue dyes such as Acid Blue C.I. 27.

Since certain changes may be made in the above processes and products without departing from the scope of the invention herein involved, it is intended that all matter contained in the above description shall be interpreted as illustrative and not in a limiting sense.

What is claimed is:

1. In a process for preparing a photographic multicolor screen element, the steps which comprise exposing a lenticular film having a first photoresponsive coating contiguous one surface thereof, said first photoresponsive coating adapted to be differentially hardened as a result of selective photoexposure to first radiation incident on said lenticular film at first angles, to provide exposed areas of said first coating contiguous each lenticule of said lenticular film receiving said first radiation; removing unexposed photoresponsive coating; dyeing exposed areas of said first coating with a first color to obtain a first series of chromatic filter elements; applying a second photoresponsive coating on the same side of said lenticular film as said first coating; exposing said second photoresponsive coating to second radiation incident on said lenticular film at second angles, to provide exposed areas of said second coating contiguous each lenticule of said lenticular film receiving said second radiation; removing unexposed photoresponsive coating; dyeing exposed areas of said second coating with a second color to obtain a second series of chromatic filter elements; applying a third photoresponsive coating on the same side of said lenticular film as said first and said second coatings; exposing said third photoresponsive coating to radiation incident on said lenticular film at third angles, to provide exposed areas of said third coating contiguous each lenticule of said lenticular film receiving said third radiation; removing unexposed photoresponsive coating; and dyeing exposed areas of said third coating with a third color to obtain a third series of chromatic filter elements.

2. A process as defined in claim 1, including the step of removing the lenticules from said lenticular film at some stage subsequent to the formation of said second series of optical filter elements.

3. A process as defined in claim 1, including the step of coating an abrasion resistant polymeric layer on the external surface of said optical filter elements.

4. A process as defined in claim 1, including the step of coating a panchromatic photographic emulsion layer on the external surface of said optical filter elements.

5. A process as defined in claim 1, including the step of coating a diffusion transfer print-receiving layer on the external surface of said optical filter elements.

6. A process as defined in claim 5, including the step of coating a panchromatic photographic emulsion layer on the external surface of said diffusion transfer print-receiving layer.

7. A process as defined in claim 1, wherein one of said colors comprises red, one of said colors comprises green, and one of said colors comprises blue.

8. A process as defined in claim 1, wherein at least one of said photoresponsive coatings comprises a polymer selected from the group consisting of potassium, sodium and ammonium dichromate sensitized gelatin.

9. A process as defined in claim 1, wherein an adhesive layer is interposed between each of said photoresponsive coatings and the layer immediately preceding.

10. A process as defined in claim 1, including the step of separating said lenticular film from its contiguous relationship with said optical filter elements at some stage subsequent to the formation of said second series of filter elements.

11. In a process for preparing a photographic multicolor screen element, the steps which comprise exposing a lenticular film having a first photoresponsive coating on one surface thereof to first radiation incident on said lenticular film at first angles, whereby to provide exposed areas of said first coating contiguous each lenticule of said lenticular film receiving said first radiation, said exposed areas comprising about one-third of the photoresponsive coating contiguous said lenticule; removing unexposed photoresponsive coating; dyeing exposed areas of said first coating with a first color to obtain a first series of monochromatic filter elements; applying a second photoresponsive coating on the same side of said lenticular film as said first coating; exposing said second photoresponsive coating to second radiation incident on said lenticular film at second angles, whereby to provide exposed areas of said second coating contiguous each lenticule of said lenticular film receiving said second radiation, said exposed areas comprising about one-third of the photoresponsive coating contiguous said lenticule; removing unexposed photoresponsive coating; dyeing exposed areas of said second coating with a second color to obtain a second series of monochromatic filter elements; applying a third photoresponsive coating on the same side of said lenticular film as said first and said second coatings; exposing said third photoresponsive coating to radiation incident on said lenticular film, whereby to provide exposed areas of said third coating contiguous each lenticule of said lenticular film receiving said third radiation, said exposed areas comprising about one-third of the photoresponsive coating contiguous said lenticule; removing unexposed photosensitive coating; and dyeing exposed areas of said third coating with a third color to obtain a third series of monochromatic filter elements.

12. In a process for preparing a photographic multicolor screen element, the steps which comprise exposing a lenticular film having a first photoresponsive coating on one surface thereof, said first photoresponsive coating adapted to be differentially hardened as a result of selective photoexposure, to first radiation incident on said lenticular film at first angles, whereby to form exposed areas of said first coating contiguous each lenticule of said lenticular film receiving said first radiation; removing unexposed photoresponsive coating; dyeing exposed areas of said first coating with a first color to obtain a first series of chromatic filter elements; applying a second photoresponsive coating adapted to be differentially hardened as a result of selective photoexposure on the same side of said lenticular film as said first coating; exposing said second photoresponsive coating to second radiation incident on said lenticular film at second angles adapted to provide exposure of said second coating substantially adjacent said first series of chromatic filter elements, whereby to form exposed areas of said second coating contiguous each lenticule of said lenticular film receiving said second radiation and substantially in juxtaposition to the first chromatic filter elements contiguous said lenticule; removing unexposed photoresponsive coating; dyeing exposed areas of said second coating with a second color to obtain a second series of chromatic filter elements; applying a third photoresponsive coating adapted to be differentially hardened as a result of selective exposure on the same side of said lenticular film as said first and said second coatings; exposing said third photoresponsive coating to diffuse radiation incident on said lenticular film, whereby to form exposed areas of exposed areas of said third coating contiguous each lenticule of said lenticular film receiving said third radiation and substantially in juxtaposition to one of said first and second chromatic filter elements contiguous said lenticule; removing unexposed photoresponsive coating; and dyeing exposed areas of said third coating with a third color to obtain a third series of chromatic filter elements.

13. In a process for preparing a photographic multicolor screen element, the steps which comprise exposing a lenticular film having a first photoresponsive coating on one surface thereof to first ultraviolet radiation incident on said lenticular film at first angles, whereby to provide exposed areas of said first coating, contiguous each lenticule of said lenticular film receiving said first radiation, comprising about one-third of the total area of said first coating; removing unexposed photoresponsive coating; dyeing exposed areas of said first coating with a first color to obtain a first series of monochromatic filter elements; applying a second photoresponsive coating on the same side of said lenticular film as said first coating; exposing said second photoresponsive coating to second radiation incident on said lenticular film at second angles whereby to form exposed areas of said second coating contiguous each lenticule of said lenticular film receiving said second radiation, said exposed areas substantially in juxtaposition to said first monochromatic filter element contiguous said lenticule and comprising about one-third of the total area of said second coating; removing unexposed photoresponsive coating; dyeing exposed areas of said second coating with a second color to obtain a second series of monochromatic filter elements; applying a third photoresponsive coating on the same side of said lenticular film as said first and second coatings; exposing said third photoresponsive coating to diffuse radiation incident on said lenticular film, whereby to form exposed areas of said third coating contiguous each lenticule of said lenticular film receiving said third radiation, said exposed areas in substantial juxtaposition to said first and said second monochromatic filter elements contiguous said lenticule and comprising about one-third of the total area of said third coating; removing unexposed photoresponsive coating; and dyeing exposed areas of said third coating with a third color to obtain a third series of monochromatic filter elements.

14. In a process for preparing a photographic multicolor screen element, the steps which comprise successively coating on the smooth surface of a lenticular film a plurality of photoresponsive layers, subjecting each photoresponsive coating to radiation whereby to form exposed areas of said coating contiguous each lenticule of said lenticular film receiving said radiation; removing unexposed photoresponsive coating; dyeing exposed areas of said coating to obtain a series of chromatic filter elements, prior to deposition of successive photoresponsive layers; each of said radiation exposures incident on said lenticular film at angles adapted to provide a plurality of chromatic filter elements each adapted to filter predetermined wave lengths of light.

15. In a process for preparing a photographic multicolor screen element, the steps which comprise successively coating on the smooth surface of a lenticular film a plurality of photoresponsive layers adapted to be differentially hardened as a result of selective photoexposure, subjecting each photoresponsive coating to radiation whereby to form exposed areas of said coating contiguous each lenticule of said lenticular film receiving said radiation, removing unexposed photoresponsive coating, dyeing exposed areas of said coating to obtain a series of chromatic filter elements, prior to deposition of successive photoresponsive layers, each of said radiation exposures incident on said lenticular film at diverse angles whereby to provide a plurality of chromatic filter elements each adapted to filter predetermined wave lengths of light, coating a photoresponsive layer on the external surface of said filter elements, thereby providing a mask to said photoresponsive layer, said mask comprising said filter elements, exposing said photoresponsive coating to diffuse radiation incident on said lenticular film, to form exposed areas of unmasked coating, removing unexposed photoresponsive coating, and dyeing exposed areas of said coating to provide a series of chromatic filter elements.

16. In a process for preparing a photographic multicolor screen element, the steps which comprise successively coating on the flat surface of a lenticular film a plurality of photoresponsive layers, subjecting each photoresponsive layer to radiation whereby to provide an exposed area of said layer contiguous each lenticule of said lenticular film receiving said ratiation; removing unexposed photoresponsive coating; dyeing exposed areas of said coating to obtain chromatic filter elements, prior to deposition of successive photoresponsive layers; at least one of said photoresponsive layers being subjected to radiation whereby to form a plurality of exposed areas of said coating contiguous each lenticule of said lenticular film receiving said radiation, said radiation incident on said lenticular film at diverse angles to provide said plurality of exposed areas.

17. In a process for preparing a photographic multicolor screen element, the steps which comprise exposing a lenticular film having a first photoresponsive coating on one surface thereof to first radiation incident on said lenticular film at a first series of angles, whereby to form a plurality of exposed areas of said first coating, contiguous each lenticule of said lenticular film receiving said first radiation; removing unexposed photoresponsive coating; dyeing exposed areas of first coating with a first color to obtain a first plurality of chromatic filter elements; applying a second photoresponsive coating on the same side of said lenticular film as said first coating; exposing said second photoresponsive coating to second radiation incident on said lenticular film at a second series of angles, whereby to form a plurality of exposed areas of said second coating contiguous each lenticule of said lenticular film receiving said second radiation, said exposed areas substantially in juxtaposition to said first filter elements; removing unexposed photoresponsive coating; dyeing exposed areas of said second coating with a second color to obtain a second plurality of filter elements; applying a third photoresponsive coating on the same side of said lenticular film as said first and said second coatings; exposing said third photoresponsive coating to diffuse radiation, whereby to form a plurality of exposed areas of said third coating contiguous each lenticule of said lenticular film receiving said third radiation, said exposed areas substantially in juxtaposition to said first and said second chromatic filter elements; removing unexposed photoresponsive coating; and dyeing exposed areas of said third coating with a third color to obtain a third plurality of chromatic filter elements.

18. In a process for preparing a photographic multicolor screen element, the steps which comprise exposing a lenticular film having a first photoresponsive coating on one surface thereof to first radiation incident on said lenticular film from a plurality of point sources positioned so as to provide radiation incident on said lenticular film at a first series of angles, whereby to provide a plurality of exposed areas of said first coating, contiguous each lenticule of said lenticular film receiving said first radiation; removing unexposed photoresponsive coating; dyeing exposed areas of said first coating with a first color to obtain a first plurality of chromatic filter elements; applying a second photoresponsive coating on the same side of said lenticular film as said first coating; exposing said second photoresponsive coating to second radiation from a plurality of point sources positioned so as to provide radiation incident on said lenticular film at a second series of angles, whereby to provide a plurality of exposed areas of said second coating contiguous each lenticule of said lenticular film receiving said second radiation; removing unexposed photoresponsive coating; dyeing exposed areas of second coating with a second color to obtain a second plurality of filter elements; applying a third photoresponsive coating on the same side of said lenticular film as said first and said second coatings; exposing said third photoresponsive coating to diffuse radiation incident on said lenticular film, whereby to form a plurality of exposed areas of said third coating contiguous each lenticule of said lenticular film receiving said third radiation; removing unexposed photoresponsive coating; dyeing exposed areas of said third coating with a third color to obtain a third plurality of chromatic filter elements; each of said first, said second and said third plurality of filter elements substantially in side-by-side relationship.

19. In a process for preparing a photographic multicolor screen element, the steps which comprise successively coating on the flat surface of a lenticular film a plurality of photoresponsive layers, subjecting each photoresponsive layer to radiation whereby to provide an exposed area of said layer; removing unexposed photoresponsive coating; dyeing exposed areas of said coating to obtain a series of chromatic filter elements, prior to deposition of successive photoresponsive layers; the exposed area of at least one of said photoresponsive layers contiguous individual lenticules provided by radiation incident on a plurality of lenticules at angles adapted to focus said radiation on said area.

No references cited.

NORMAN G. TORCHIN, *Primary Examiner.*

ALEXANDER D. RICCI, *Examiner.*

RONALD H. SMITH, *Assistant Examiner.*